Figure 1:
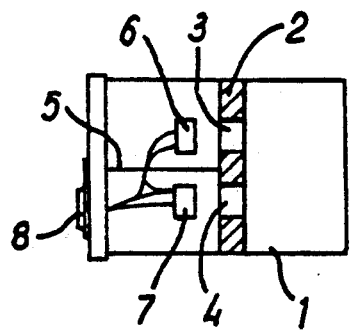

United States Patent [19]
Holt

[11] Patent Number: 5,268,915
[45] Date of Patent: Dec. 7, 1993

[54] METHOD AND APPARATUS FOR ASSESSING LASER TEMPERATURE

[75] Inventor: John Holt, Mold, England

[73] Assignee: British Nuclear Fuels plc, Warrington, England

[21] Appl. No.: 747,355

[22] Filed: Aug. 20, 1991

[30] Foreign Application Priority Data

Aug. 22, 1990 [GB] United Kingdom ............... 9018420

[51] Int. Cl.$^5$ .................... H01S 3/04; H01S 3/045
[52] U.S. Cl. ................................................. 372/34
[58] Field of Search .................. 356/416, 418, 419; 372/34, 38, 29, 32

[56] References Cited

U.S. PATENT DOCUMENTS 3,656,856 4/1972 Katz et al. .................... 356/416

Primary Examiner—Rodney B. Bovernick
Assistant Examiner—Robert E. Wise
Attorney, Agent, or Firm—William R. Hinds

[57] ABSTRACT

The operating temperature of a laser can be assessed by determining the ratio of light of different wavelengths emitted by the laser. A copper vapor laser emits green and yellow light having two distinct wavelengths and the ratio of said wavelengths is temperature dependant. Preferably the ratio of green to yellow light is in the region of 2 to 1 for optimum operating conditions. The ratio is determined using green and yellow light filters (3, 4) having associated light dependant resistors (6, 7) forming input and feedback resistors in an operational amplifier circuit (9).

8 Claims, 1 Drawing Sheet

METHOD AND APPARATUS FOR ASSESSING LASER TEMPERATURE

The present invention concerns a method and apparatus for assessing the temperature of lasers, and in particular copper vapour lasers.

A copper vapour laser emits light at two distinct wavelengths, namely green at 510 nm and yellow at 578 nm. The amount of each colour is temperature dependent, that is the amounts depend upon the operating temperature within the ceramic tube confining the copper vapour. Green light predominates at lower temperature with the amount of yellow light increasing with increasing temperature.

According to one aspect of the present invention a method of assessing the temperature of a laser which emits radiation in at least two different spectral region comprises the steps of filtering the optical output of the laser into its respective spectral components, detecting the amount of filtered radiation which is of a first one of the spectral components, detecting the amount of filtered radiation which is of a second one of the spectral components, and utilising signals representative of the respective amounts of detected radiation of the two spectral components in an electrical circuit to calculate the ratio of the two amounts, whereby the ratio of the two spectral components detected provides an assessment of the temperature of the laser.

Desirably, in a copper vapour laser, the ratio of green to yellow light should be in the region of 2 to 1. With a decrease in the proportion of green light, for example a ratio of 1 to 1, the temperature can become so hot as to deform and bend the laser tube. If, on the other hand, the laser becomes too cool, for example a ratio of 3 to 1, then it is inefficient.

According to another aspect of the present invention, apparatus for assessing the temperature of a laser which emits radiation in at least two different spectral regions comprises, in addition to the laser, means for filtering the optical output of the laser into its respective spectral components, detector means for detecting the amount of filtered radiation which has a first one of the spectral components and for detecting the amount of filtered radiation which has a second and different one of the spectral components, and an electrical circuit connected to the detector means for calculating the ratio of the respective amounts of light detected of the two spectral components, whereby the ratio of the two spectral components detected provides an assessment of the temperature of the laser For assessing the temperature of a copper vapour laser the apparatus can comprise green and yellow light filters having associated light dependant resistors, said resistors forming input and feedback resistors in an operational amplifier circuit.

Figure 2:
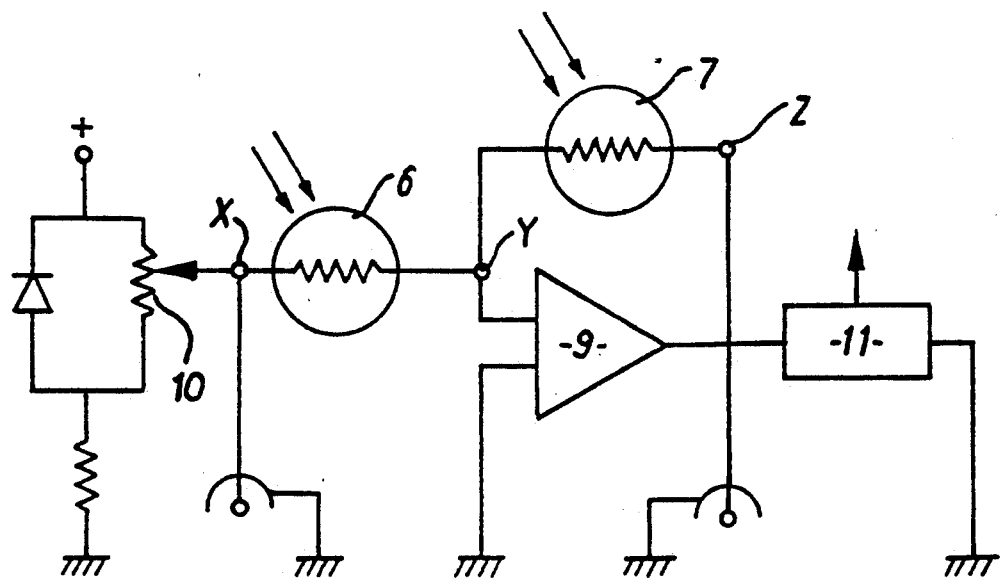

An embodiment of the invention will now be described, by way of example, with reference to the accompanying drawings; in which:

FIG. 1 is a diagrammatic representation of a light ratio meter for use with a laser; and FIG. 2 is a schematic circuit diagram of the light ratio meter.

FIG. 1 shows a cylindrical housing 1 containing an opaque inner wall 2, such as a tufnol disc. A green light filter 3 and a yellow light filter 4 are mounted in the wall 2. At one side of the wall 2 the housing 1 is open to permit light from a laser to fall upon the filters 3 and 4.

At the opposite side of the wall 2 the closed end of the housing is divided into two compartments by a partition wall 5. All surfaces of the housing 1 and the partition wall 5 are matt black.

Two light dependent resistors 6 and 7 are mounted one behind each of the filters 3 and 4. The light dependent resistors are matched to have substantially the same resistance under substantially the same lighting conditions.

The light dependent resistors 6 and 7 are included in the circuit of FIG. 2 by means of a 3 pin DIN socket 8. In FIG. 2, the socket connections are denoted by X, Y and Z. The circuit comprises an operational amplifier 9, a potentiometer 10 for calibration and a three digit LCD meter 11 for output display.

The light dependant resistors 6 and 7 form the input and feedback resistors in the operational amplifier circuit. The amplification of the amplifier is given by:

Amplification A = Resistance feedback Resistance in

In the present case the "resistance feedback" corresponds to the resistor 7 associated with the yellow light and the "resistance in" corresponds to the resistor 6 associated with the green light.

As indicated, it is desirable that the intensity of the green light is twice that of the yellow.

Consequently, the resistor 6 will be half the resistive value of the resistor 7. This results in an amplification factor of 2.

Although concerned with the ratio of green to yellow light emitted by copper vapour lasers it is anticipated that the principle of using light ratios to assess temperature can be applied to other lasers having light at distinct wavelengths and capable of separation by light filters.

In addition the ratio of green to yellow light can be used to denote a fault condition in the laser head. Thus it has been demonstrated that the amount of yellow light increases if air leaks into the laser head. Hence a decrease in the green to yellow light ratio can indicate an air leak into the laser head as well as unsatisfactory operating temperature conditions.

I claim:

1. A method of assessing the temperature of a laser which emits radiation in at least two different spectral regions comprising the steps of filtering the optical output of said laser into its respective spectral components, detecting the amount of filtered radiation which is of a first one of said spectral components, detecting the amount of filtered radiation which is of a second and different one of said spectral components, and utilising signals representative of the respective amounts of detected radiation of said two spectral components in an electrical circuit to calculate the ratio of said two amounts, whereby the ratio of the two spectral components detected provides an assessment of the temperature of the laser.

2. A method according to claim 1 in which said laser is a copper vapor laser and said method comprises measuring by said circuit the ratio of green light to yellow light emitted by said laser.

3. Apparatus for assessing the temperature of a laser which emits radiation in at least two different spectral regions which comprises, in addition to said laser, means for filtering the optical output of said laser into its respective spectral components, detector means for detecting the amount of filtered radiation which has a first one of said spectral components and for detecting the amount of filtered radiation which has a second and different one of said spectral components, and an electrical circuit connected to the detector means for calculating the ratio of the respective amounts of light detected of said two spectral components, whereby the ratio of the two spectral components detected provides an assessment of the temperature of the laser.

4. Apparatus according to claim 3 in which said laser is a copper vapor laser and said means for filtering comprises green and yellow light filters, and said detector means comprises light dependent resistors associated respectively with said green and yellow filters, said resistors forming input and feedback resistors in an operation amplifier circuit.

5. Apparatus according to claim 4 in which the light dependent resistors are matched to have substantially the same resistance under substantially the same lighting conditions.

6. Apparatus according to claim 5 in which the feedback resistor is associated with the yellow light filter and the input resistor is associated with the green light filter.

7. Apparatus according to claim 6 in which the resistance of the input resistor is half the resistance of the feedback resistor.

8. Apparatus according to claim 3 and which comprises a display for displaying the ratio calculated by the electrical circuit as a measure of the assessed temperature of the laser.

* * * * *